(12) United States Patent
Newton et al.

(10) Patent No.: US 6,679,943 B1
(45) Date of Patent: Jan. 20, 2004

(54) COATING CONTAINING ADHESION PROMOTING ADDITIVE

(75) Inventors: David L. Newton, Toledo, OH (US); Lawrence E. Thieben, Waterville, OH (US)

(73) Assignee: BASF Corporation, Southfield, MI (US)

( * ) Notice: Subject to any disclaimer, the term of this patent is extended or adjusted under 35 U.S.C. 154(b) by 2 days.

(21) Appl. No.: 10/136,688

(22) Filed: May 1, 2002

(51) Int. Cl.$^7$ ............................................. C09D 183/12
(52) U.S. Cl. ..................... 106/287.14; 106/287.28; 427/387; 427/386; 428/447; 428/412; 428/423.1
(58) Field of Search ..................... 106/287.14, 287.28; 427/387, 386; 428/447, 412, 423.1

(56) References Cited

U.S. PATENT DOCUMENTS

| | | | |
|---|---|---|---|
| 5,610,128 A | | 3/1997 | Zyhowski et al. ............ 510/288 |
| 5,686,012 A | * | 11/1997 | Hayashi et al. ............ 252/62.56 |
| 5,741,876 A | | 4/1998 | Carpenter, II et al. ......... 528/10 |
| 5,749,956 A | | 5/1998 | Fisher et al. ............ 106/287.28 |
| 5,859,136 A | * | 1/1999 | Scopazzi et al. ............. 525/123 |
| 6,037,014 A | | 3/2000 | Edgington .................. 427/544 |
| 6,080,816 A | * | 6/2000 | Gregorovich et al. ........ 525/100 |
| 6,231,990 B1 | | 5/2001 | Lin et al. .................... 428/447 |
| 6,232,424 B1 | | 5/2001 | Zhong et al. ................. 528/12 |
| 6,291,571 B1 | * | 9/2001 | Fisher ........................ 524/464 |
| 6,306,943 B1 | * | 10/2001 | Henry ........................ 524/270 |

FOREIGN PATENT DOCUMENTS

| WO | WO01/98413 | 12/2001 | ........... C08L/67/00 |
|---|---|---|---|

OTHER PUBLICATIONS

Data Sheet S1, entitled: Silicone surface additives with medium reduction of surface tension, 02/99, on 2 pages.
Data Sheet S2, entitled: Silicone surface additives with strong reduction of surface tension, 10/01, on 4 pages.
Data Sheet S5, entitled: Silicone surfactants to improve substrate wetting in aqueous systems, 02/99, on 3 pages.
Data Sheet S101, entitled: Silicone surfactant to improve substrate wetting in aqueous systems, 06/01, on 2 pages.
Product Information Sheet, Product name: BYK–300, Sep. 25, 2001, Issued by Franu Dr. Wittek–Hufnagel, on 1 page.
Product Information Sheet, Product name: BYK–307, Sep. 9, 2001, Issued by Franu Dr. Wittek–Hufnagel, on 1 page.
Product Information Sheet, Product name: BYK–345, Sep. 25, 2001, Issued by Franu Dr. Wittek–Hufnagel, on 1 page.
Product Information Sheet, Product name: BYK–347, Sep. 25, 2001, Issued by Franu Dr. Wittek–Hufnagel, on 1 page.
BYK®–300, entitled: Solution of a polyether modified dimethylpolysiloxane–copolymer, on 1 page.
BYK®–307, entitled: Polyether modified dimethylpolysiloxane copolymer, on 1 page.
BYK®–345, entitled: Polyether modified dimethylpolysiloxane, on 1 page.
BYK®–347, entitled: Polyether modified siloxane, on 1 page.

* cited by examiner

*Primary Examiner*—Margaret G. Moore
(74) *Attorney, Agent, or Firm*—Michael F. Morgan

(57) ABSTRACT

A solvent borne coating composition comprising a resin, a polyether modified dimethylpolysiloxane, and parachlorobenzotrifluoride.

23 Claims, 1 Drawing Sheet

COATING CONTAINING ADHESION PROMOTING ADDITIVE

FIELD OF THE INVENTION

The present invention relates to coatings containing an additive for promoting adhesion.

BACKGROUND OF THE INVENTION

As used herein, "automotive refinish" refers to compositions and processes used in the repair of a damaged automotive finish, usually an OEM provided finish. Refinish operations may involve the repair of one or more outer coating layers, the repair or replacement of entire automotive body components, or a combination of both. The terms "refinish coating" or "repair coating" may be used interchangeably.

Automotive refinishers must be prepared to paint a wide variety of materials. Examples of commonly encountered materials are one or more previously applied coatings, plastic substrates such as RIM, SMC and the like, and metal substrates such as aluminum, galvanized steel, and cold rolled steel. Bare metal and plastic substrates are often exposed as a result of the removal of the previously applied coating layers containing and/or surrounding the defect area. However, it is often difficult to obtain adequate adhesion of refinish coatings applied directly to exposed bare substrates.

Among the many factors influencing the degree of refinish coating/substrate adhesion are the type of exposed substrate, the presence or absence of adhesion promoting pretreatments and/or primers, the size of the exposed area to be repaired, and whether previously applied "anchoring" coating layers surround the exposed repair area.

For example, refinish adhesion is particularly challenging when the exposed substrate is a bare metal such as galvanized iron or steel, aluminum or cold rolled steel. It is especially hard to obtain adequate refinish adhesion to galvanized iron. "Galvanized iron or steel" as used herein refers to iron or steel coated with zinc. "Steel" as used herein refers to alloys of iron with carbon or metals such as manganese, nickel, copper, chromium, molybdenum, vanadium, tungsten and cobalt.

Refinish operations have traditionally used adhesion pretreatments to overcome the adhesion problems associated with the coating of bare metal substrates. Pretreatment as used herein may refer to either mechanical or chemical alterations of the bare metal substrate. Mechanical alterations used to obtain improved adhesion include sanding, scuffing, and the like. Chemical alterations include treatment of the substrate with compositions such as chromic acid conversion coatings, acid etch primers and the like.

Although such pretreatments have obtained improved refinish adhesion, they are undesirable for a number of reasons. Most importantly, pretreatments are inefficient and expensive to apply in terms of material, time, and/or labor costs. Some chemical pretreatments also present industrial hygiene and disposal issues. Finally, the use of some pretreatments such as acid etch primers may contribute to water sensitivity and/or coating failure under test conditions of extreme humidity.

Accordingly, it is highly desirable to eliminate the need for substrate pretreatment as regards the refinish coating of bare metal substrates.

In addition, adhesion to bare metal substrates is improved when the defect area to be repaired is relatively small and is surrounded by previously applied coating layers. Such previously applied coating layers act as an 'adhesion anchor' to the refinish coating. However, many refinish repairs are of a size such that they lack any surrounding adhesion anchors. Moreover, such anchoring adhesion may be completely absent when replacement body parts are painted with a refinish coating.

Another factor in formulating coatings is the volatile organic compounds (VOCs) that are released from the coating when it is applied. In solvent borne coating systems, there is a desire to reduce volatile organic compounds in order to comply with environmental requirements. One method of reducing VOCs is to use exempt solvents, which are solvents that are not calculated as a VOC emission.

One type of exempt solvent is parachlorobenzotrifluoride, which is sold under the trade name OXSOL™ 100 by Occidental Chemical. One problem with using this type of solvent in a solvent borne system is that this solvent has a tendency to displace adhesional constituents, such as resin and anti-corrosive pigments, in the coating from the surface of bare metals. Without being limited to theory, it is theorized that the parachlorobenzotrifluoride has a low surface tension that operates to displace the other constituents in a coating composition. It would be desirable to improve the adhesion of solvent borne coating systems that contain parchlorobenzotrifluoride.

SUMMARY OF THE INVENTION

The present invention relates to a solvent borne coating composition comprising a resin, a polyether modified dimethylpolysiloxane, and parachlorobenzotrifluoride.

The present invention also relates to a method comprising applying the coating composition to a substrate and forming a coating.

DETAILED DESCRIPTION

A solvent borne coating composition comprising a resin, a polyether modified dimethylpolysiloxane, and parachlorobenzotrifluoride.

As used in this specification and in the claims, the term polyether modified dimethylpolysiloxane copolymer refers to the composition having a number average molecular weight of about 700, a weight average molecular weight of about 1,975, and a polydispersity of about 2.8. Also included in this definition are equivalent polyether modified dimethylpolysiloxanes having a similar gel permeation chromatograph (GPC) curve, a similar infrared spectrum, a similar number average molecular weight, a similar number weight average molecular weight, a similar polydispersity, and which are capable of increasing the adhesion of a coating composition that contains parachlorobenzotrifluoride.

Figure 1:
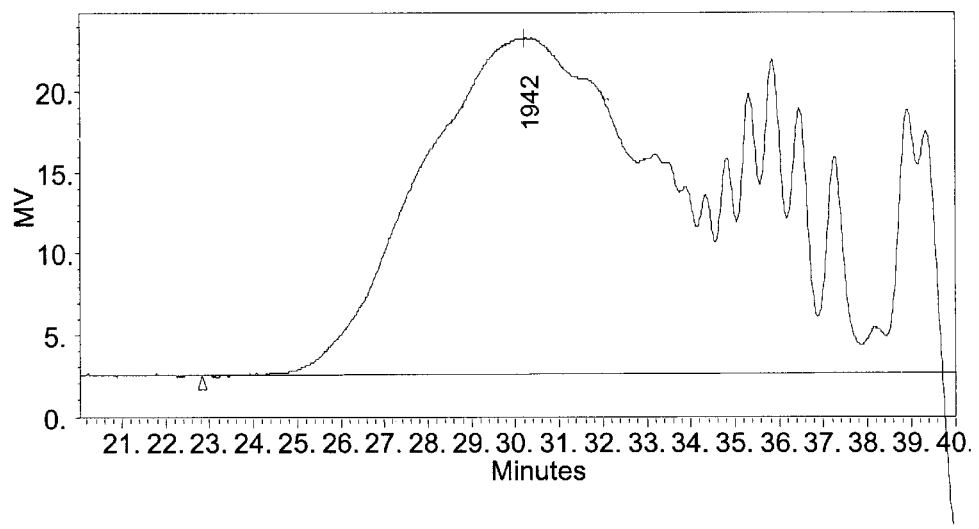
FIG. 1 is a gel permeation chromatography curve for the polyether modified dimethylpolysiloxane used in the present invention.
Figure 2:
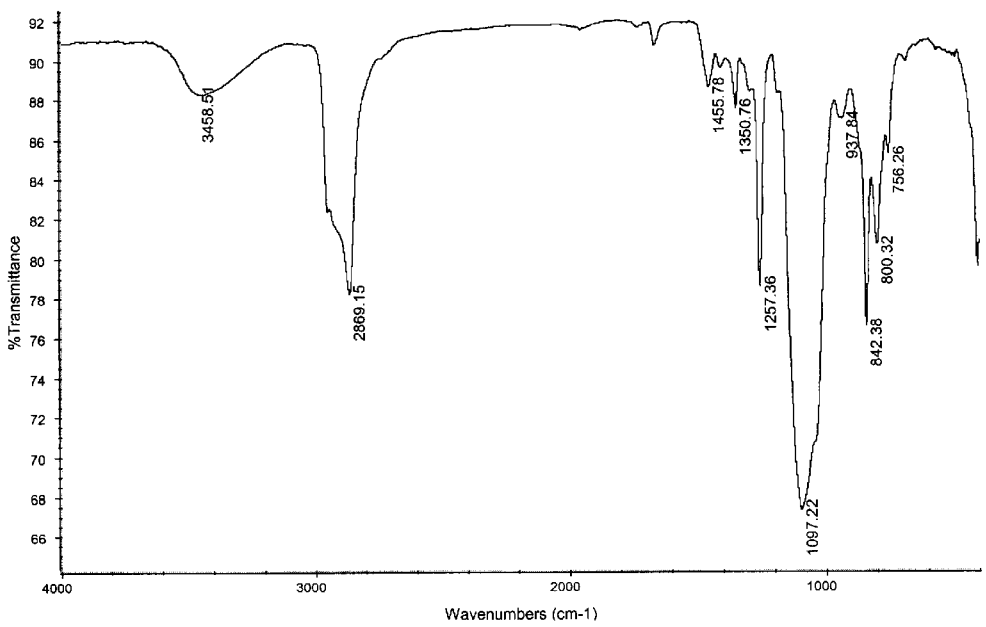
FIG. 2 is an infrared spectrum for the polyether modified dimethylpolysiloxane used in the present invention.

The polyether modified dimethyl polysiloxane copolymer of the present invention is supplied from BYK Chemie USA, Inc. as BYK®345 surfactant. The GPC curve and the infrared spectrum of the polyether modified dimethyl polysiloxane copolymer supplied as BYK®345 surfactant are provided in FIGS. 1 and 2.

There are other polyether modified dimethyl polysiloxane copolymers available, such as BYK®300 and BYK®307 surfactants, but the present invention is directed to the polyether modified dimethylpolysiloxane copolymer as defined above, which can be obtained as BYK®345 surfactant.

Parachlorobenzotrifluoride has the chemical name 1-chloro-4-(trifluoromethyl) benzene.

The amount of parachlorobenzotrifluoride in a coating composition can be any desired amount to provide a desired solids content, viscosity, and flow for sprayability and sag resistance and for hiding. The amount of the polyether modified dimethyl polysiloxane copolymer can be any amount that provides a desired level of adhesion given the amount of parachlorobenzotrifluoride in the coating composition. In one embodiment of the coating composition, based on the total weight of the composition, the amount of polyether modified dimethyl polysiloxane copolymer preferably ranges in an amount up to about 0.12%, preferably about 0.06 to about 0.12%, and most preferably about 0.09%, and the amount of parachlorobenzotrifluoride ranges in an amount up to about preferably up to about 50%, more preferably about 15 to about 30%.

The effect of adding the polyether modified dimethyl polysiloxane copolymer to a coating composition containing the parachlorobenzotrifluoride can be observed in the results of an adhesion test. In the GMX adhesion test, ASTM D3359, the adhesion on aluminum substrates after 4 days of humidity testing will improve from a range of GM4 (60% loss) to GM6 (30% loss) to a range of GM9 (5% loss) to GM10 (0% loss) depending how quickly the adhesion is tested after removal from the humidity cabinet. The greater amounts of loss are associated with testing adhesion within one hour of removal from humidity, while the lower loss of adhesion results represent adhesion testing done one day later. As a result, the adhesion of the composition containing the polyether modified dimethyl polysiloxane is greater than a composition without the polyether modified dimethyl polysiloxane.

The coating composition can additionally comprise a polyether modified siloxane. The polyether modified polysiloxane can be obtained as BYK®347 surfactant from BYK Chemie USA, Inc. Without being limited by theory, it is theorized that the polyether modified siloxane improves flowout of the coating compositions upper surface, which promotes filling-in of uneven areas, without interfering with the adhesional benefits at the substrate of the polyether modified dimethyl polysiloxane copolymer. The amount of the polyether modified siloxane can be any amount that provides a desired flowout of the coating composition. In one embodiment of the coating composition, the polyether modified siloxane can be present in an amount up to about 0.12%, preferably about 0.06 to about 0.12%, most preferably about 0.09% based on the weight of the coating composition.

The term resin includes any type of resin, binder, or polymer that can be included in a coating composition. Examples of resin include, but are not limited to, polyesters, polyacrylates, polyurethanes, polyamides, polylactones, polycarbonates, polyolefins, alkyds, oil-modified alkyds, epoxy-unsaturated fatty acid ester resins, addition resins with pendent olefinic groups, condensation resins with pendent olefinic groups, lacquer resins, cellulose esters.

The resin can be a film-forming polymer that comprises one or more functional groups that are reactive with one or more functional groups on a crosslinking agent. Examples of functional group combinations useful for the production of crosslinked coatings include, but are not limited to, active-hydrogen and isocyanate, epoxide and carboxylic acid, hydroxyl/carboxylic acid and/or urea-formaldehyde/melamine-formaldehyde, epoxide and amine, and the like.

Although the film-forming polymer may contain any functional group reactive with the functional group present on the crosslinking agent, preferably the functional group present on the film-forming polymer is at least one functional group selected from the group consisting of hydroxyl, amine, carboxylic acid, epoxy and mixtures thereof Especially preferred functional groups for use on the film-forming polymer are hydroxyl groups and amine groups, with hydroxyl groups being most preferred.

Examples of suitable film-forming polymers are acrylic polymers, polyurethane polymers, polyesters, alkyds, polyamides, epoxy group containing polymers, and the like.

Particularly preferred film forming polymers will be difunctional, generally having an average functionality of about two to eight, preferably about two to four. These compounds generally have a number average molecular weight of from about 400 to about 10,000, preferably from 400 to about 8,000. However, it is also possible to use low molecular weight compounds having molecular weights below 400. The only requirement is that the compounds used as film-forming polymers not be volatile under the heating conditions, if any, used to cure the compositions.

More preferred compounds containing reactive hydrogen groups are the known polyester polyols, polyether polyols, polyhydroxyl polyacrylates, polycarbonates containing hydroxyl groups, and mixtures thereof In addition to these preferred polyhydroxyl compounds, it is also possible to use polyhydroxy polyacetals, polyhydroxy polyester amides, polythioether containing terminal hydroxyl groups or sulphydryl groups or at least difunctional compounds containing amino groups, thiol groups or carboxy groups. Mixtures of the compounds containing reactive hydrogen groups may also be used.

In another embodiment, the film forming polymer reactable with the crosslinking agent is an acrylic resin, which may be a polymer or oligomer. The acrylic polymer or oligomer preferably has a number average molecular weight of 500 to 1,000,000, and more preferably of 1000 to 20,000. Acrylic polymers and oligomers are well-known in the art, and can be prepared from monomers such as methyl acrylate, acrylic acid, methacrylic acid, methyl methacrylate, butyl methacrylate, cyclohexyl methacrylate, and the like. The active hydrogen functional group, e.g., hydroxyl, can be incorporated into the ester portion of the acrylic monomer. For example, hydroxy-functional acrylic monomers that can be used to form such resins include hydroxyethyl acrylate, hydroxybutyl acrylate, hydroxybutyl methacrylate, hydroxypropyl acrylate, and the like. Amino-functional acrylic monomers would include t-butylaminoethyl methacrylate and t-butylaminoethylacrylate. Other acrylic monomers having active hydrogen functional groups in the ester portion of the monomer are also within the skill of the art.

Modified acrylics can also be used. Such acrylics may be polyester-modified acrylics or polyurethane-modified acrylics, as is well-known in the art. Polyester-modified acrylics modified with ε-caprolactone are described in U.S. Pat. No. 4,546,046 of Etzell et al, the disclosure of which is incorporated herein by reference. Polyurethane-modified acrylics are also well-known in the art. They are described, for example, in U.S. Pat. No. 4,584,354, the disclosure of which is incorporated herein by reference.

Polyesters having active hydrogen groups such as hydroxyl groups can also be used as the film forming polymer in the composition according to the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Polyurethanes having active hydrogen functional groups are also well-known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). They can be provided with active hydrogen functional groups by capping the polyurethane chain with an excess of diol, polyamine, amino alcohol, or the like.

Although polymeric or oligomeric active hydrogen components are often preferred, lower molecular weight non-polymeric active hydrogen components may also be used in some applications, for example aliphatic polyols (e.g., 1,6-hexane diol), hydroxylamines (e.g., monobutanolamine), and the like.

Examples of suitable crosslinking agents include those compounds having one or more functional groups reactive with the functional groups of the film-forming polymer. Examples of suitable crosslinking agents include isocyanate functional compounds and aminoplast resins, epoxy functional compounds, acid functional compounds and the like. Preferred crosslinkers are isocyanate functional compounds.

Suitable isocyanate functional compounds include polyisocyanates which are aliphatic, including cycloaliphatic polyisocyanates, or aromatic. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, hexamethylene diisocyanate (HDI), 1,4-methylene bis-(cyclohexylisocyanate) and isophorone diisocyanate. Useful aromatic diisocyanates include the various isomers of toluene diisocyanate, meta-xylenediioscyanate and para-xylenediisocyanate, also 4-chloro-1,3-phenylene diisocyanate, 1,5-tetrahydronaphthalene diisocyanate, 4,4'-dibenzyl diisocyanate and 1,2,4-benzene triisocyanate can be used. In addition, the various isomers of $\alpha,\alpha,\alpha',\alpha'$-tetramethyl xylene diisocyanate can be used.

In one embodiment, the crosslinking agent will comprise one or more components selected from the group consisting of hexamethylene diisocyanate (HDI), the isocyanurates of HDI, the biurets of HDI, and mixtures thereof, with the isocyanurates and biurets of HDI being particularly preferred.

Suitable isocyanate functional compounds may be unblocked, in which case the coating composition should be utilized as a two component system, i.e., the reactive components combined shortly before application, or they may be blocked. Any known blocking agents, such as alcohols or oximes, may be used.

In one embodiment, the coating composition will be a two-component system with the reactive film forming polymer and the crosslinking agent being combined shortly before application. In another embodiment, the coating composition can be a one-component system.

Additionally, the coating composition can include any other material that is added to coating compositions. Examples of other materials include, but are not limited to, crosslinking agents, fillers, solvents, coloring agents, driers, corrosion inhibitors, rheology control agents, mar/slip additives, wetting agents, dispersing agents, light stabilizers, adhesion promoters, pH adjusting agents, and flow control additives. Each of these other materials can be used in any amount that is used by one of ordinary skill in the art to prepare coating compositions.

Examples of fillers include, but are not limited to, clays, talc, calcium carbonate, diatomaceous earth, mica, kaolin, barium sulfate, magnesium carbonate, Aerosil, vermiculite, graphite, alumina, silica, and rubber powder. Coloring agents such as titanium dioxide and carbon black can also be used as the fillers.

Examples of solvents include, but are not limited to, glycol ethers, ketones, acetates, aliphatic hydrocarbons, aromatic hydrocarbons, halogenated hydrocarbons, and alcohols.

Examples of coloring agents include, but are not limited to, color pigments, effect pigments, color and effect pigments, and dyes. Various organic pigments and inorganic pigments may be broadly used as the coloring agents, but non-toxic anticorrosive pigments are preferred. Examples of such pigments are phosphate-type anticorrosive pigments such as zinc phosphate, calcium phosphate, aluminum phosphate, titanium phosphate, silicon phosphate, and ortho- and fused phosphates of these; molybdate-type anticorrosive pigments such as zinc molybdate, calcium molybdate, calcium zinc molybdate, potassium zinc molybdate, potassium zinc phosphomolybdate and potassium calcium phosphomolybdate; and borate-type anticorrosive pigments such as calcium borate, zinc borate, barium borate, barium meta-borate and calcium meta-borate.

Examples of rheology control agents include, but are not limited to, organo clays, hydrogenated caster oils, silica gels, polyvinyl alcohol, cellulose derivatives such as hydroxyethyl cellulose, hydroxypropyl cellulose and carboxymethyl cellulose salt, polyether compounds, urethane modified polyether compounds, polycarboxylic acid compounds, sodium salts of polycarboxylic compounds, polyvinylpyrrolidone, polyoxyethylene derivatives such as polyethylene glycol ether and polyethylene glycol distearate, sodium alginate and inorganic materials such as sodium silicate and bentonite.

Examples of mar/slip additives include, but are not limited to, silicones, micronized waxes, polyesters, and fluorosurfactants.

Examples of wetting agents include, but are not limited to, fatty acid salts, multifunctional urethanes, and polyalkyl ethers.

The dispersing agents include, but are not limited to, inorganic dispersing agents such as sodium salts of polycarboxylic acids, sodium or ammonium salts of fused naphthalene sulfonate, polyoxyalkylene alkyl ethers of phenol ether, sorbitan fatty acid esters, polyoxyalkylene fatty acid esters, glycerin fatty acid esters, polyoxyethylene styrene phenol, sodium tripolyphosphate and sodium hexametaphosphate. Organosilanol derivatives of tung oil, or linseed oil, or high erucic acid rapeseed oil that are useful as surfactants are also suitable as dispersing agents.

Examples of adhesion promoters include, but are not limited to, phosphate esters, silanes, (meth)acrylic acid, metal salts of (meth)acrylic acid, vinyl phosphonic acid, vinyl sulfonic acid, 2-acrylamido-2-methyl propane sulfonic acid, carboxylic acid functional (meth)acrylates, (meth)acrylate functional urethane monomers, (meth)acrylate functional urethane oligomers, and the direct to metal additives described in U.S. Ser. No. 09/599,693 filed on Jun. 22, 2000, which is incorporated herein by reference.

Examples of flow control additives include, but are not limited to, acrylic resins, silicones, and fluorocarbons.

The coating composition of the present invention can be applied to a substrate by any method known in the art. Application methods include, but are not limited to, brushing, rolling, and spraying. Once applied, the coating composition is formed into a coating by allowing the coating composition to air dry, oven dry, bake, or combinations thereof.

Substrates that can be coated with the coating composition of the present invention include, but are not limited to, metal, plastic, wood, wall board, plaster, glass, and ceramics. The present invention is particularly useful when the coating composition is applied directly to metal.

In one embodiment, the coating composition can be used as an automotive refinish. As used herein, "automotive refinish" refers to compositions and processes used in the repair of a damaged automotive finish, usually an OEM provided finish. Refinish operations may involve the repair of one or more outer coating layers, the repair or replacement of entire automotive body components, or a combination of both. The terms "refinish coating" or "repair coating" may be used interchangeably.

Automotive refinishers can paint a wide variety of materials. Examples of commonly encountered materials are one or more previously applied coatings, plastic substrates such as RIM, SMC and the like, and metal substrates such as aluminum, galvanized steel, and cold rolled steel. "Galvanized iron or steel" as used herein refers to iron or steel coated with zinc. "Steel" as used herein refers to alloys of iron with carbon or metals such as manganese, nickel, copper, chromium, molybdenum, vanadium, tungsten and cobalt. Bare metal and plastic substrates are often exposed as a result of the removal of the previously applied coating layers containing and/or surrounding the defect area.

SPECIFIC EMBODIMENTS OF THE INVENTION

The invention is further described in the following example. The example is merely illustrative and does not in any way limit the scope of the invention as described and claimed. The test method used in the examples was the GMX humidity tape adhesion test of ASTM D3359.

Compositions were prepared that contained a primer composition with parachlorobenzotrifluoride. Three different compositions were tested. One had no polyether modified dimethyl polysiloxane copolymer, one had BYK®300 polyether modified dimethyl polysiloxane copolymer, and one had BYK®345 polyether modified dimethyl polysiloxane copolymer. The compositions are described in Table 1 below.

The compositions were tested on aluminum, galvanized, and cold rolled steel substrates. The substrates were prepared by sanding with a double action sander with 80 grit paper. The substrates were cleaned of sanding residue with R-M®901 pre-paint cleaner solvent from BASF Corporation.

The primer compositions were applied to the substrates. A pigmented basecoat system, sold under the name DIAMONT® from BASF Corporation, was applied to the primer and was allowed to flash off for 20 minutes. The basecoat contained in a 4:1:1 volume ratio Garnet Red DB3512 pigment, BCH2 isocyanate basecoat hardener, and UR50 reducer, all supplied from BASF Corporation. A clearcoat, sold under the name R-M® DC92 from BASF Corporation, was applied in 3 coats over the basecoat with 10 minute flash off between coats. The clearcoat was mixed by volume ratio of 3:1:0.6 of DC92, DH46 hardener, and UR50 reducer, all available from BASF Corporation.

The samples were allowed to cure at ambient temperature for 48 hours. They were then baked for 2 hours at 120° F. and 1 hour at 140° F. before humidity testing was started.

TABLE 1

| Material (grams) | A | B | C |
|---|---|---|---|
| Primer DP200 from BASF Corp. with parachlorobenzotrifluoride (OXSOL® 100) at 15.2% by weight | 1000.0 | 1000.0 | 1000.0 |
| BYK® 300 polyether modified dimethyl polysiloxane copolymer (52% N.V.) | 0 | 1.38 | 0 |
| BYK® 345 polyether modified dimethyl polysiloxane copolymer (80% N.V.) | 0 | 0 | 0.90 |
| Exempt isocyanate hardener for adhesion to aluminum substrates (PH210 from BASF Corporation) | 175.5 | 175.5 | 175.5 |
| Exempt reducer 95% acetone/5% parachlorobenzotrifluoride (OXSOL® 100) (VR-29 from BASF Corporation) | 121.5 | 121.5 | 121.5 |
| Total Weights | 1297.0 | 1298.4 | 1297.9 |
| GM Rating/% Loss | | | |
| Humidity 4 days Adhesion Q412 aluminum panel from Q-panel | 4/−60% | 3/−85% | 9/−5% |
| Next Day Recovery from Humidity for Q412 aluminum panel | 6/−30% | 9/−5% | 10/−0% |
| Humidity 4 days Adhesion Galvanized (ACT) | 1/−100% | 1/−100% | 1/−100% |
| Next Day Recovery from Humidity for Galvanized | 1/−100% | 1/−100% | 1/−100% |
| Humidity 4 days Adhesion R412 Cold Rolled Steel from Q-panel | 5/−45% | 5/−45% | 5/−45% |
| Next Day Recovery from Humidity for R412 Cold Rolled Steel | 9/−5% | 9/−5% | 10/−0% |

The results of the testing show that the use of polyether modified dimethylpolysiloxane (BYK®345) overcomes adhesion problems in coatings that contain parachlorobenzotrifluoride (OXSOL®100), which is theorized to cause low surface tension problems. Without being limited to theory, it was theorized that the parachlorobenzotrifluoride lays down a film of solvent on the metal and prevent the resin and anticorrosive pigments from contacting the metal surface. The polyether modified dimethylpolysiloxane appears to have a lower surface tension than the parachlorobenzotrifluoride, thereby displacing the solvent from the metal surface and allowing the resin and pigments to make intimate contact with the surface of the metal, which encourages a much stronger bond at the paint to metal interface.

It should be appreciated that the present invention is not limited to the specific embodiments described above, but includes variations, modifications and equivalent embodiments defined by the following claims.

What is claimed is:

1. A solvent borne coating composition comprising a resin, a polyether modified dimethylpolysiloxane, and parachlorobenzotrifluoride wherein at least one of the following conditions is present:
   a. the polyether modified dimethylpolysiloxane has a number average molecular weight of about 700, a weight average molecular weight of about 1,975, and a polydispersity of about 2.8, and
   b. wherein the polyether modified dimethylpolysiloxane has a gel permeation chromatograph curve and an infrared spectrum given by FIGS. 1 and 2, respectively.

2. The coating composition of claim 1, wherein the polyether modified dimethylpolysiloxane is present in an amount up to about 0.12% based on a total weight of the coating composition.

3. The coating composition of claim 1, wherein the polyether modified dimethylpolysiloxane is present in an amount from about 0.06% to about 0.12% based on a total weight of the coating composition.

4. The coating composition of claim 1, wherein the parachlorobenzotrifluoride is present in an amount up to about 50% based on a total weight of the coating composition.

5. The coating composition of claim 1, wherein the parachlorobenzotrifluoride is present in an amount from about 15% to about 30% based on a total weight of the coating composition.

6. The coating composition of claim 1, wherein a coating prepared from the coating composition has an adhesion loss on an aluminum substrate according to ASTM D3359 flat is at least one of i) from 0 to about 5% initially and ii) from 0 to about 5% after 24 hours.

7. The coating composition of claim 6, wherein the adhesion loss after 24 hours is 0.

8. The coating composition of claim 1 further comprising a polyether modified siloxane in addition to and different from the polyether modified dimethylpolysiloxane.

9. The coating composition of claim 8, wherein the polyether modified siloxane is present in an amount up to about 0.12% based on a total weight of the coating composition.

10. The coating composition of claim 8, wherein the polyether modified siloxane is present in an amount from about 0.06% to about 0.12% based on a total weight of the coating composition.

11. The coating composition of claim 1, wherein the polyether modified dimethylpolysiloxane has a number average molecular weight of about 700, a weight average molecular weight of about 1,975, and a polydispersity of about 2.8.

12. The coating composition of claim 1, wherein the polyether modified dimethylpolysiloxane has a gel permeation chromatograph curve and an infrared spectrum given by FIGS. 1 and 2, respectively.

13. A method comprising applying the coating composition of claim 1 to a substrate and forming a coating.

14. The method of claim 13, wherein the polyether modified dimethylpolysiloxane is present in the coating composition in an amount up to about 0.12% based on a total weight of the coating composition.

15. The method of claim 13, wherein the polyether modified dimethylpolysiloxane is present in the coating composition in an amount from about 0.06% to about 0.12% based on a total weight of the coating composition.

16. The method of claim 13, wherein the parachlorobenzotrifluoride is present in the coating composition in an amount up to about 50% based on a total weight of the coating composition.

17. A The method of claim 15, wherein the parachlorobenzotrifluoride is present in the coating composition in an amount from about 15% to about 30% based on a total weight of the coating composition.

18. The method of claim 15, wherein the coating has an adhesion loss on an aluminum substrate according to ASTM D3359 that is at least one of i) from 0 to about 5% initially and ii) from 0 to about 5% after 24 hours.

19. The method of claim 18, wherein the adhesion loss after 24 house is 0.

20. The method of claim 15, wherein the coating composition further comprises a polyether modified siloxane in addition to and different from the polyether modified dimethylpolysiloxane.

21. The method of claim 20, wherein the polyether modified siloxane is present in an amount up to about 0.12% based on a total weight of the coating composition.

22. The method of claim 20, wherein the polyether modified siloxane is present in an amount from about 0.06% to about 0.12% based on a total weight of the coating composition.

23. A substrate prepared by the method of claim 15.

* * * * *